H. CORY AND O. D. GRAY.
FRICTION LINING.
APPLICATION FILED APR. 20, 1920.

1,421,412.

Patented July 4, 1922.
2 SHEETS—SHEET 1.

Witness:
Stephen A. Kelna

Inventors:
Harvey Cory.
Orron D. Gray.

Inventors:
Harvey Cory,
Orrin D. Gray.

UNITED STATES PATENT OFFICE.

HARVEY CORY AND ORRIN D. GRAY, OF CHICAGO, ILLINOIS.

FRICTION LINING.

1,421,412.        Specification of Letters Patent.       Patented July 4, 1922.

Application filed April 20, 1920. Serial No. 375,289.

*To all whom it may concern:*

Be it known that we, HARVEY CORY and ORRIN D. GRAY, both citizens of the United States, residing at Chicago, in the county of Cook and State of Illinois, have invented certain new and useful Improvements in Friction Linings, of which the following is a specification.

This invention relates to a friction lining such as is particularly adapted for use with clutches, transmissions, brakes, etc. As illustrative of one use to which the invention may be put, the description to follow, as well as the drawings therein referred to, has particular reference to a planetary transmission such as is used in Ford automobiles.

According to present practice, a lining, usually in the form of a fabric strip, is secured to the inner face of a flexible band which is adapted to be tightened about a revolving drum, thereby applying a desired degree of friction so as to check gently the speed of the drum or to hold it against rotation. The drum, together with its associated parts, may be housed within a suitable casing that contains an oil reservoir so that all the parts are required to operate in a bath or spray of oil. The lining which is generally used to obtain proper frictional effects, will in these circumstances give satisfactory service for a considerable period of time, but ultimately will become burned or charred on its friction face, owing to the heat that is generated in use. In order that the lining may possess the requisite degree of tensile strength and wearing ability, it is generally subjected to a treatment which usually involves its impregnation with certain materials which have the effect of rendering it compact and of reducing its absorptiveness. For these reasons, as well as others, the oil within the reservoir is unable to permeate through the fibres of the lining sufficiently to afford proper lubrication, so that it is eventually burned and charred, and its friction face becomes both glazed and hardened.

The frictional material at present used for linings is rather compact and unyielding, and so is incapable of being materially compressed. Furthermore, after some use this friction material loses practically all of its resiliency—in most cases becoming very hard. The ideal frictional lining for a brake or a clutch should possess a great degree of resiliency, and should maintain this resiliency throughout its lifetime, because the smoothness with which a clutch or brake takes hold depends upon the softness of the initial contact of the frictional members. Consequently, a frictional material which would combine strength and great resiliency, as well as a high co-efficient of friction, would be a perfect brake or clutch lining.

With a view to obviating the difficulties just mentioned, we have aimed in this invention to provide an improved lining which is so formed as to be better compressible, and also to receive adequate lubrication, so that its performance in service is vastly improved, and its life is greatly prolonged.

In the embodiment of this invention it is possible to adopt a number of different forms or constructions, three of which are illustrated in the accompanying drawings wherein.

Figure 1:
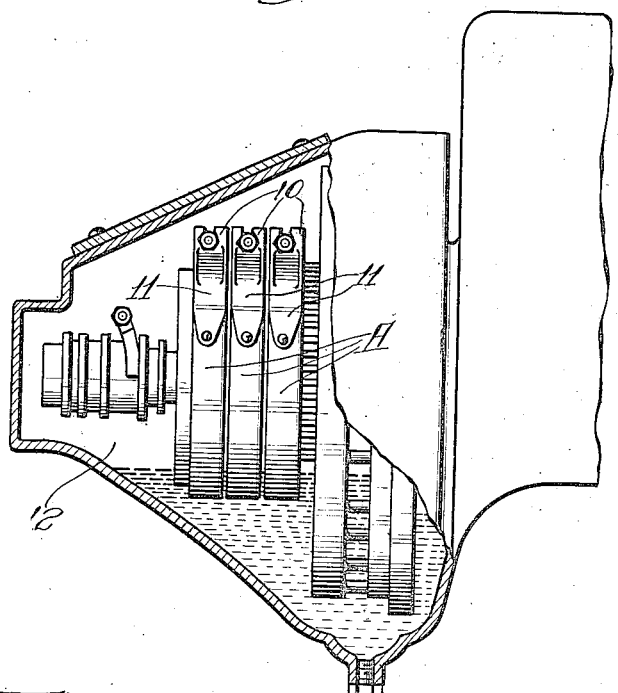
Figure 1 is a transverse section through a housing containing a planetary transmission, the view exhibiting an oil reservoir as well as three bands each of which is lined on its inner surface with a friction lining.
Figure 2:
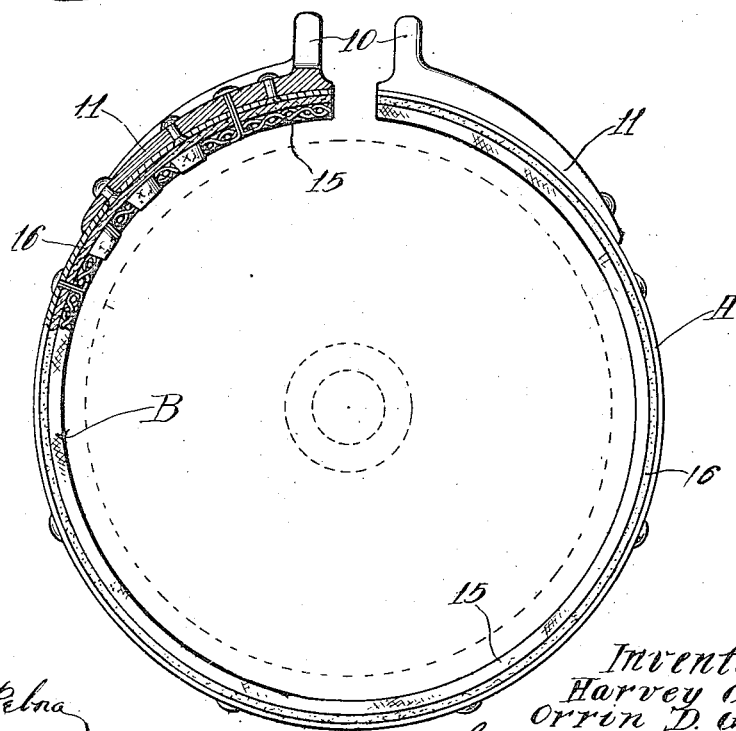
Fig. 2 is an elevation of an edge of one band detached from its associated mechanism, a lining being shown upon its inner face; a portion of the figure is broken away to better exhibit the parts in longitudinal section.

Referring now particularly to Figs. 1 and 2, the lining may be applied to a clutch in which is included a band A in the form of a split ring to the ends of which are secured upstanding slotted lugs 10 each equipped with a foot 11 bolted or otherwise made fast to the band. These parts of the band are intended to co-operate with other elements (not shown) which act to tighten the band against a drum or the like when friction is to be applied thereto. To the inner side of the band is secured a friction lining which is attached to the band by any suitable means, such as rivets, as shown. The split band best shown in Fig. 2 may be arranged operatively with respect to a clutch, brake, or the like, and its associated parts, the entire mechanism being housed within a casing 12, as illustrated in Fig. 1, wherein is provided a reservoir for oil, the level of which is kept at the desired point. When the mechanism is in operation certain of the parts are revolved through the oil so as to have the effect of carrying the oil up in the form of a sheet around the sides of the casing by which action the entire mechanism is treated to a bath or spray of oil. In this manner the oil reaches practically all parts of the mechanism, except upon the inner face of the lining where the maximum friction obtains, and where burning or charring is most likely to occur.

Figure 3:
Figs. 3 and 4 are longitudinal sections and plan views, respectively, of one form of lining embodying this invention.
Figure 4:
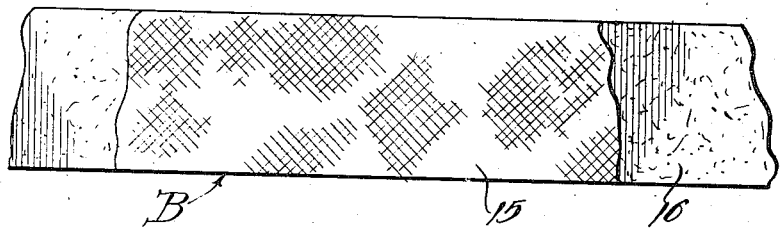

According to this invention which makes for a better clutching action and for a better lubrication, the friction lining B is duplex in character, being composed of a facing material 15, such as cotton fabric, which may be so treated with pitches, stearines, oils, or otherwise, as to acquire additional strength, toughness, wearability, and a higher co-efficient of friction, in combination with a backing material 16, such as felt, which possesses both cushioning and absorptive properties to a marked degree. These two materials are arranged one upon the other, and are preferably tied together as a unit either by stitching, by an adhesive, or by any other appropriate means. When operatively positioned, the cushion material 16 lies adjacent the band so as to present the wearing material 15 to the moving surface to which friction is to be applied. A duplex lining embodying both a backing and facing of the character just described is illustrated clearly in Figs. 3 and 4, and may also be otherwise constructed, as will now be explained.

Figure 5:
Figs. 5 and 6 are similar views of another form of lining embodying this invention.
Figure 6:
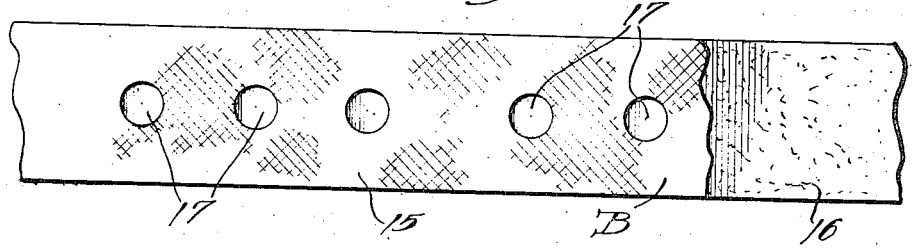
Figure 7:
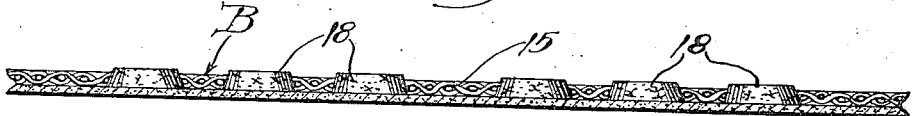
Figs. 7 and 8 are similar views of still another form of lining embodying this invention.
Figure 8:
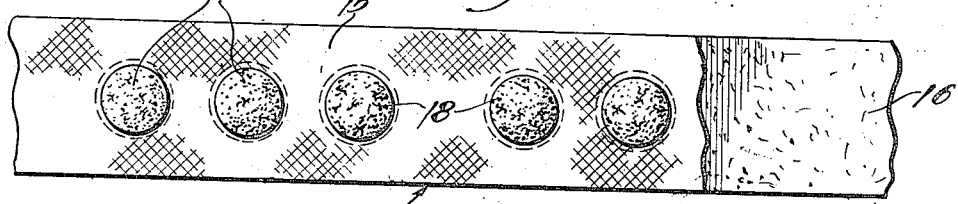

In Figs. 5 and 6, we have shown a duplex lining made similarly except that its facing is provided with a plurality of openings 17 permitting a free flow of oil from the backing through to the friction face of the lining. In Figs. 7 and 8 the lining is provided with a plurality of cork inserts 18 the same as is shown in Fig. 2, these inserts being preferably carried in the facing so as to present their inner ends against the backing.

When the band is loose upon the drum, the lining contacts therewith only lightly, so that a film of oil may form upon the drum's surface, but when the band is tightened to frictionally engage the drum, this oil film is squeezed out from under the lining, so that a high degree of heat is generated. With continued usage, the lining becomes charred, burned and hardened, so that it is unfit for use. According to this invention, however, the lining may have as a part of itself a backing which is in the nature of a cushion and which is also in the nature of a sponge, in that it may absorb into its own body a quantity of the lubricating fluid that is contained within the reservoir.

Under conditions of pressure, as above explained, the yieldability of the backing imparts to the facing a desirable cushioning effect which it would otherwise lack when engaging with the drum; this same pressure also tends to express from the backing some of the oil that is soaked therein, a portion of this being forced through the facing itself to lubricate its wearing surface. This action is particularly effective in the case of a lining formed as shown in Figs. 5 and 6 where the passages 17 permit oil to freely pass through the facing for this purpose. In the case of a lining constructed as shown in Figs. 7 and 8, the cork inserts which protrude slightly above the acting surface of the facing receive the initial compression and in consequence the portions of the backing immediately adjacent the inserts are first compressed to express therefrom the oil which then is free to reach the friction face of the lining via the slight space around the inserts. This lubricating action is supplemented with further tightening of the band when the lining itself is also subjected to pressure. Where corks are employed for the inserts, they are in themselves yieldable to a certain extent and hence are particularly suitable for use with a friction lining, but this ability to yield is further enhanced when the corks present their rear faces to a backing which is also yieldable, as in the present construction.

The lining of this invention is particularly advantageous in that it provides means for lubricating its friction face during the interval when such lubrication is most needed. Under ordinary conditions of usage, the band does not remain tightened for any great length of time, so that when pressure is withdrawn, the felt or other backing employed will reabsorb sufficient oil to be effective for lubricating the fabric lining at the time the next application of pressure is made.

It is to be understood that the present invention may be applied to uses other than with a clutch such as has been described, and where lubrication may or may not be an important factor. The three constructions that have been described are merely suggestive of a number of modified forms that our invention may take, all of which, as defined in the claims below, are included within the scope of this patent.

We claim:

1. A friction lining of the kind described having, in combination, a wearing material adapted to apply friction, and a compressible backing material upon which the wearing material may yield, the backing material having absorptive properties such that it will express liquid therefrom under compression, substantially as described.

2. A friction lining of the kind described having, in combination, a wearing material with openings therein, and a backing of absorptive material adjacent thereto adapted, when compressed, to express liquid through the openings to reach the friction face of the wearing material, substantially as described.

3. A friction lining of the kind described having, in combination, a wearing material provided with openings wherein are friction inserts, and a backing of absorptive material arranged adjacent the rear end of each insert, the backing material when subjected to pressure being adapted to express liquid through the spaces around each insert to reach the friction face of the wearing material, substantially as described.

4. A friction lining of the kind described having, in combination, a wearing material provided with openings wherein are compressible friction inserts protruding above the friction face of the lining, and a backing of compressible material arranged adjacent the rear face of the inserts whereby each insert may recede within the backing when the lining is first subjected to pressure, substantially as described.

5. A duplex friction lining of the kind described having, in combination, a facing of wearing material and a backing of compressible absorptive material, the two materials being united, substantially as described.

6. A duplex friction lining of the kind described, having, in combination, a facing and an absorptive backing, the latter having a greater degree of yieldability, substantially as described.

7. A duplex friction lining of the kind described having, in combination, a facing and an absorptive backing, the former of fabric and the latter of felt, substantially as described.

8. A duplex friction lining of the kind described having, in combination, a facing of wearing material to which is united a backing of compressible material, and a friction insert adjacent the backing material but carried by the wearing material and adapted to move against the backing material under pressure, substantially as described.

HARVEY CORY.
ORRIN D. GRAY.

Witness:
EPHRAIM BANNING.